(12) United States Patent
Nolan et al.

(10) Patent No.: US 10,390,232 B2
(45) Date of Patent: Aug. 20, 2019

(54) SYSTEMS AND METHODS FOR A WIRELESS NETWORK BRIDGE

(71) Applicant: Intel Corporation, Santa Clara, CA (US)

(72) Inventors: Keith Nolan, Mullingar (IE); Mark Kelly, Leixlip (IE); Hugh Carr, Wicklow (IE)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 15/504,606

(22) PCT Filed: Mar. 27, 2015

(86) PCT No.: PCT/US2015/023169
§ 371 (c)(1),
(2) Date: Feb. 16, 2017

(87) PCT Pub. No.: WO2016/032573
PCT Pub. Date: Mar. 3, 2016

(65) Prior Publication Data
US 2017/0238189 A1    Aug. 17, 2017

Related U.S. Application Data

(60) Provisional application No. 62/043,945, filed on Aug. 29, 2014.

(51) Int. Cl.
*H04W 16/14* (2009.01)
*H04W 92/02* (2009.01)

(52) U.S. Cl.
CPC ............ *H04W 16/14* (2013.01); *H04W 92/02* (2013.01)

(58) Field of Classification Search
CPC . H04W 84/12; H04W 74/0816; H04W 72/04; H04W 16/14; H04W 92/02;
(Continued)

(56) References Cited

U.S. PATENT DOCUMENTS 7,881,726 B2    2/2011 Gurney et al.
8,041,335 B2 *  10/2011 Khetawat ............ H04L 63/104
                                                          455/404.2
(Continued)

FOREIGN PATENT DOCUMENTS

EP          2451128 A1    5/2012
WO      1998/002011 A1    1/1998
(Continued)

OTHER PUBLICATIONS

International Search Report and Written Opinion for PCT/US2015/023169, dated Jul. 10, 2015. 11 pages.
(Continued)

*Primary Examiner* — Will W Lin
(74) *Attorney, Agent, or Firm* — Eversheds Sutherland (US) LLP (57) ABSTRACT

This disclosure describes systems, and methods related to bridging communication networks. A computing device may identify one or more signals at one or more communication interfaces in accordance with one or more communication standards. The computing device may select one or more available frequency segments from a frequency spectrum database. The computing device may transform the one or more signals into one or more converted signals for transmission on a backhaul link, the backhaul link being established for two-way data communication using the one or more available frequency segments. The computing device may cause to send the one or more converted signals using the one or more available frequency segments.

25 Claims, 7 Drawing Sheets

(58) Field of Classification Search
CPC ... H04L 5/00; H04L 27/2601; H04L 12/2863; H04L 1/0003
See application file for complete search history.

(56) References Cited

U.S. PATENT DOCUMENTS

| | | | |
|---|---|---|---|
| 8,385,483 | B2 | 2/2013 | Abdelmonem et al. |
| 8,514,825 | B1* | 8/2013 | Addepalli ............. H04W 4/046 370/338 |
| 8,547,989 | B2 | 10/2013 | Dayal et al. |
| 8,619,582 | B2* | 12/2013 | Wang ................ H04W 72/1263 370/236 |
| 8,767,631 | B2 | 7/2014 | Huai-Rong et al. |
| 8,879,573 | B2* | 11/2014 | Bahl ....................... H04L 43/00 370/445 |
| 2007/0093249 | A1 | 4/2007 | Khoshaba et al. |
| 2007/0184813 | A1 | 8/2007 | Pascht et al. |
| 2010/0111018 | A1 | 5/2010 | Chang |
| 2010/0195562 | A1 | 8/2010 | Kentaro et al. |
| 2011/0249770 | A1 | 10/2011 | Bellaouar et al. |
| 2013/0034043 | A1* | 2/2013 | Yu ....................... H04W 72/085 370/315 |
| 2013/0230059 | A1* | 9/2013 | Quan .................. H04L 1/1614 370/474 |
| 2013/0250845 | A1 | 9/2013 | Greene et al. |
| 2014/0035722 | A1* | 2/2014 | Kincaid ............. G07C 9/00111 340/5.61 |
| 2014/0073289 | A1* | 3/2014 | Velasco ................. H04W 12/04 455/411 |
| 2014/0080535 | A1* | 3/2014 | Gauvreau ............ H04W 16/14 455/513 |
| 2014/0162585 | A1* | 6/2014 | Bose ..................... H04W 16/14 455/404.1 |
| 2015/0195670 | A1* | 7/2015 | Agee ....................... H04W 4/70 375/133 |
| 2015/0282218 | A1* | 10/2015 | Lopes .................. H04W 24/02 370/329 |
| 2015/0319622 | A1* | 11/2015 | Sun ..................... H04W 72/082 455/454 |
| 2015/0382199 | A1* | 12/2015 | Sun ........................ H04W 16/14 455/447 |
| 2017/0118697 | A1* | 4/2017 | Soldati ................. H04W 16/14 |
| 2017/0150504 | A1* | 5/2017 | Soldati .............. H04W 72/0406 |
| 2018/0269926 | A9* | 9/2018 | Agee ....................... H04W 4/70 |

FOREIGN PATENT DOCUMENTS

| | | |
|---|---|---|
| WO | 2002/027640 A2 | 4/2002 |
| WO | 03032524 | 4/2003 |
| WO | 2009/009863 A1 | 1/2009 |
| WO | 2013/052506 A1 | 4/2013 |

OTHER PUBLICATIONS

Office Action and Search Report issued in Taiwanese application No. 104124557, dated Nov. 24, 2016. 16 pages.
Partial Supplementary European Search Report issued in Application No. 15836076.8, dated Mar. 19, 2018 (16 pages).
Supplementary European Search Report for European Application No. 15836076, dated Jul. 18, 2018, 16 pages.

* cited by examiner

SYSTEMS AND METHODS FOR A WIRELESS NETWORK BRIDGE

CROSS-REFERENCE TO RELATED APPLICATION

This application is a U.S. National Stage Application under 35 U.S.C. 371 and claims the priority benefit of International Application No. PCT/US2015/023169, filed Mar. 27, 2015, which claims the benefit of U.S. Provisional Application No. 62/043,945, filed Aug. 29, 2014, the disclosures of which are incorporated herein by reference as if set forth in full.

TECHNICAL FIELD

This disclosure generally relates to systems and methods for wireless communications and, more particularly, to a bridging device.

BACKGROUND

As more people use mobile devices around the world they increase demand for wireless spectrum. These devices may use Wi-Fi (based on the IEEE 802.11 standard range), mesh technologies such as Zigbee© (based on the IEEE 802.15.4 standard) and Zwave©, or cellular networks such as GPRS, 3G, and Long Term Evolution (LTE) based on the 3GPP range of standards. Mobile users have to rely on cellular networks to access the Internet in geographic areas that lack Wi-Fi access. Consequently, they must access a licensed wireless spectrum by installing a SIM card and by subscribing with a network operator. However, mobile users may not be able to access the Internet because cellular connections may not even be possible due to poor cellular coverage. For example, these users may have trouble obtaining cellular coverage in areas such as national parks, remote areas, and below ground level in buildings, to name a few.

As more and more mobile users access the Internet through cellular networks, more network capacity may be needed. Consequently, cellular network operators face a significant problem with providing capacity for voice and data for mobile users because of the increased need for network capacity. Another issue that in environments where short bursts of data are needed, for example, in an Internet of Things (IoT) environment. This may present a problem to cellular networks because of the increased overhead associated with handling rapid connections and disconnections.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments. The terms "communication station," "station," "handheld device," "user device," "mobile device," "wireless device," and "user equipment" (UE) as used herein refer to a wireless communication device such as a cellular telephone, smartphone, tablet, netbook, wireless terminal, laptop computer, a small cell, High Data Rate (HDR) subscriber station, access point, access terminal, or other personal communication system (PCS) device. The device may be either mobile or stationary.

In addition to the above, wireless devices may also include devices for wireless machine communications such as for example, wireless sensor/actuator devices. A wireless device can also be a wireless access point, a router, a server, etc.

One or more example embodiments discussed herein relate to systems, methods, and devices for bridging various networks to allow access to other networks such as the Internet. The present disclosure generally relates to Wi-Fi networks, communication networks using ultra-high frequency (UHF), IEEE 802.11, IEEE 802.15.4, or the like.

Television shows, radio programs, GPS signals, and wireless phones all use radio frequency spectrum to send data through the air. The radio frequency spectrum used for wireless communication ranges from low frequency radio waves at around 9 kHz (or lower) up to 1000 GHz or more. The radio frequency spectrum is divided into frequency bands reserved for mobile users when they have data to be transmitted. Within each frequency band, individual users use separate frequencies (or channels) to prevent interference. Since the radio frequency spectrum is finite, a finite number of frequency bands exist. Within a radio frequency spectrum, there may be unused or unlicensed frequency segments. Some examples of unused or unlicensed frequency segments include white spaces, commonly referred to as 'TV whitespace," and frequencies available through Licensed Shared Access (LSA)/Authorized Shared Access (ASA) scheme, where unused parts of exclusively licensed spectrum may be made available for secondary usage by the licensee(s). LSA/ASA is a concept that allows spectrum that has been licensed for one mobile network operator (MNO) to be shared by more than one entity under a regulator's supervision with predetermined rules and conditions. It is understood that other examples of unused and/or unlicensed frequency segments may exist.

In one embodiment, a network bridging system may leverage the unutilized frequency ranges to provide connectivity to one or more users that may be located in a remote area where typical Wi-Fi hotspots or other access points may not be available.

The network bridging system may include a bridging device that may allow a user to connect through an interface (e.g., Wi-Fi) and may allow the data signals transmitted through that interface to be prepared by a series of amplification, modulation, encoding, and/or multiplexing techniques to allow such data signals to be transmitted using an interface to one of the spectrum segments that were determined to be available.

The spectrum segments may be made available from a spectrum database that may contain unutilized frequency segments or may contain frequency segments that may be made available under the LSA/ASA scheme.

Figure 1:
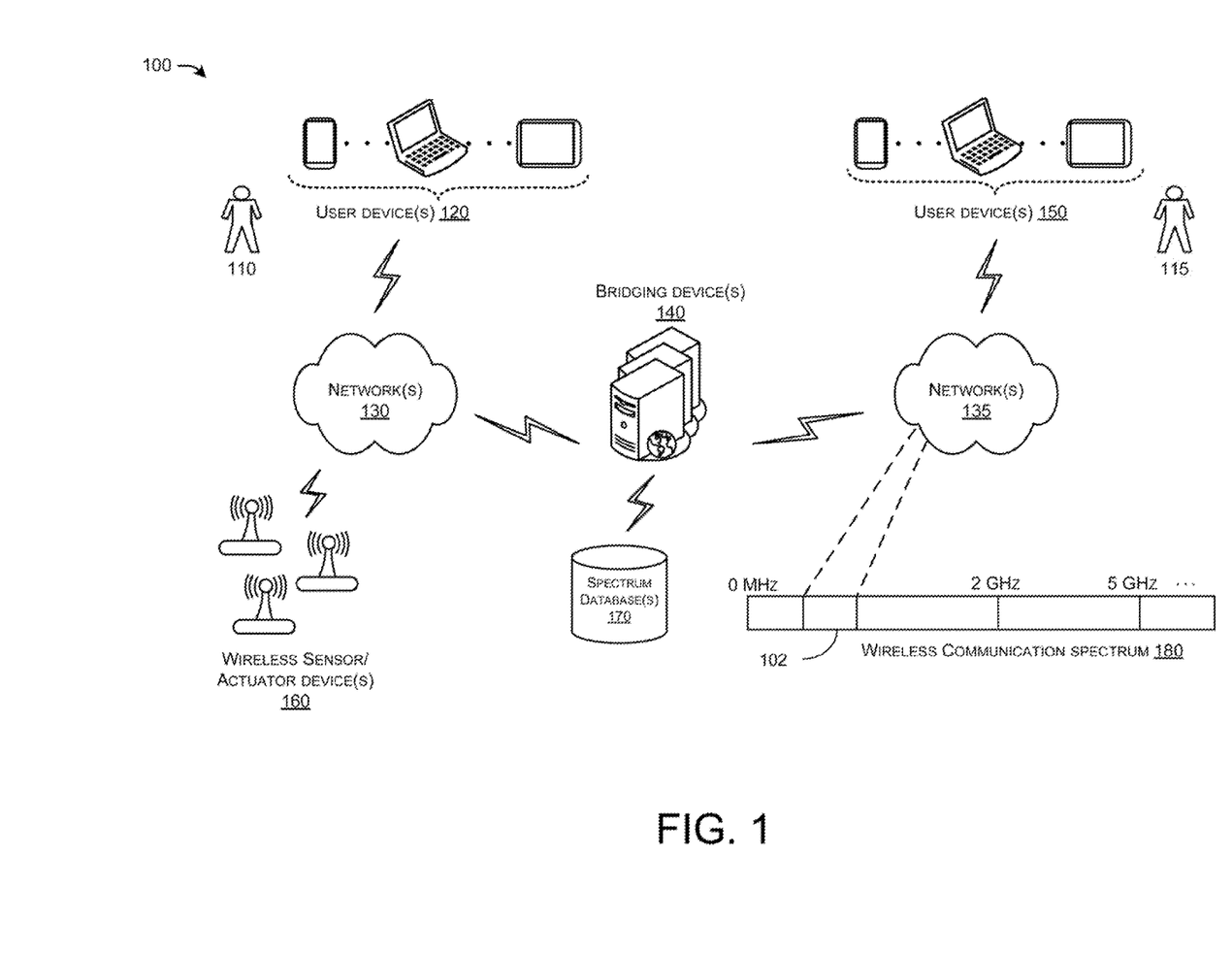
FIG. 1 depicts an illustrative example of data flow between components of an illustrative network bridging system, according to one or more example embodiments of the present disclosure.

FIG. 1 depicts an illustrative data flow between components of an illustrative network bridging system 100 in accordance with one or more embodiments of the disclosure. The network bridging system 100 may include user devices 120 and 150, networks 130 and 135, bridging devices 140, and spectrum database 170.

One or more illustrative user devices (e.g., user devices 120 and 150) may be operable by one or more users (e.g., users 110 and 115). The user devices 120 and 150 may include any suitable processor-driven user device including, but not limited to, a desktop computing device, a laptop computing device, a server, a router, a switch, a smartphone, a tablet, wearable wireless device (e.g., bracelet, watch, glasses, ring, etc.) and so forth.

Any of the user devices (e.g., user devices 120 and 150), bridging device(s) 140, and wireless sensor/actuator device(s) 160 may be configured to communicate with each other and any other component of the network bridging system 100 via one or more communications networks (e.g., networks 130 and 135) wirelessly or wired. Any of the communications networks 130 and 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks (e.g., networks 130 and 135) may have any suitable communication range associated therewith and may include, for example, global networks (e.g., the Internet), metropolitan area networks (MANs), wide area networks (WANs), local area networks (LANs), or personal area networks (PANs). In addition, any of the communications networks (e.g., networks 130 and 135) may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any user device (e.g., user devices 120 and 150), bridging device(s) 140, and wireless sensor/actuator device(s) 160, may include one or more communications antennae. Communications antenna may be any suitable type of antenna corresponding to the communications protocols used by the user device(s) (e.g., user devices 120 and 150), bridging device(s) 140, and wireless sensor/actuator device(s) 160. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices (e.g., user devices 120 and 150).

Any of the user device(s) (e.g., user devices 120 and 150), bridging device(s) 140, and wireless sensor/actuator device(s) 160 may include any suitable radio and/or transceiver for transmitting and/or receiving radio frequency (RF) signals in the bandwidth and/or channels corresponding to the communications protocols utilized by any of the user device(s) (e.g., user devices 120 and 150), bridging device(s) 140, and wireless sensor/actuator device(s) 160 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

The user device(s) (e.g., user device 120) may communicate with one or more wireless sensors (e.g., wireless sensor/actuator device(s) 160). The wireless sensor/actuator device(s) 160 may be configured to access one or more wireless networks. Some non-limiting examples of wireless sensor/actuator device(s) 160 may include sensor/actuator device(s) in a home network, sensor/actuator device(s) in an industrial setting, sensor/actuator device(s) in an automotive setting (e.g. in-car sensor/actuator device(s)), sensor/actuator device(s) employed for health care etc. The user device(s) 120 may communicate wirelessly or through one or more networks (e.g., network(s) 130). User device(s) 150 may communicate wirelessly with user device(s) 120, bridging device 140, and networks 130 or 135.

The spectrum database(s) 170 may provide information regarding the available frequency spectrum segments that may be used at a deployment location and at a point in time.

The spectrum database(s) 170 may include unused or unlicensed frequency segments, such as white spaces and/or frequency segments made available under a LSA/ASA scheme.

The bridging device(s) 140 may include any suitable processor-driven device, including, but not limited to, a desktop computing device, a laptop computing device, a server, a router, a switch, a network element, or any device capable of acting as a bridging point between one or more networks.

The bridging device(s) 140 may provide data backhaul for devices such as devices for wireless machine communications, for example, wireless sensor/actuator devices 160 (e.g., access points, sensor/actuator devices(s) in a home network, sensor/actuator device(s) in an industrial setting, sensor/actuator devices(s) in an automotive setting (e.g. in-car sensor/actuator devices(s)), sensor/actuator device(s) employed for health care, etc.) through the opportunistic use of available spectrum in the sub-1 GHz frequency range or frequencies available through LSA/ASA scheme. The bridging device(s) 140 may be used, for example, with a combined Wi-Fi hotspot and mesh network to serve multiple types of wireless sensor networks. In one example embodiment, data to/from these networks may be backhauled to the Internet using a wireless link operating in the sub-1 GHz frequency range (e.g. white space spectrum) or frequencies available through LSA/ASA scheme. Other wireless links operating in other frequency ranges may also be utilized to backhaul data to the network (e.g., Internet).

The bridging device(s) 140 may include one or more transceivers (e.g., IEEE 802.15.4 and IEEE 802.11 transceivers). The bridging device(s) 140 may be configured to initialize these transceivers in order to connect one or more networks to the internet or to an end user (e.g., user device(s) 150).

The bridging device(s) 140 may be configured to establish a connection with a spectrum database. This may determine the availability of frequency segments that may be used for transmitting data in a certain geographic area. Additionally/alternatively, the bridging device(s) 140 may determine whether spectrum under the LSA/ASA scheme is available for utilizing frequency segments that are made available for secondary usage by the licensee(s).

The bridging device (s) 140 may initiate a backhaul link to establish a connection between one or more users and a network (e.g., Internet). The bridging device (s) 140 may allocate a timeframe for using the available frequency segments, where the timeframe is based on any spectrum lease durations determined by the spectrum database and/or LSA/ASA scheme. The bridging device (s) 140 may prepare data signals to be transmitted using the available frequency segments.

A user 110 located in a geographic area lacking access to Wi-Fi connectivity may be required to utilize cellular connections through cellular networks such as GSM, CDMA, LTE, or other cellular networks in order to connect to other users or to the Internet. However, user 110 may not be able to complete the connection in geographic areas lacking the infrastructure for making that connection between user device 120 and user device 150 or the Internet.

In one embodiment, the bridging device(s) 140 may be configured to allow connectivity between user device(s) 120 and user device(s) 150 or the Internet by utilizing available resources not typically used by Wi-Fi or network operators. The bridging device(s) 140 may act as an intermediary device between two or more networks (e.g., networks 130 and 135) by converting one network's signals into the other network's signals in order to achieve connectivity between two entities. For example, the bridging device(s) 140 may provide connectivity between user device(s) 120 and the user device(s) 150 or the Internet by providing accessibility through available and unused frequency segments (e.g., frequency segment 102) in the sub-1 GHz frequency spectrum of a wireless communication spectrum 180 or frequencies available through LSA/ASA scheme. The bridging device(s) 140 may then facilitate the connection between user device(s) 120 and the user device(s) 150 or the Internet by allowing the data to be modulated and transmitted over these available and unused frequency segments.

Figure 2:
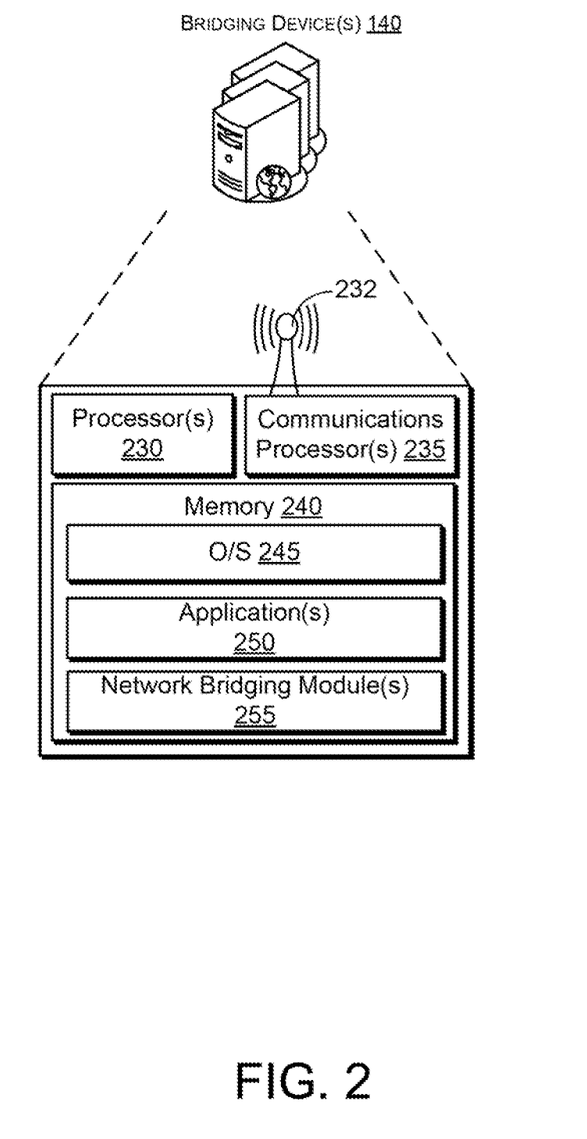
FIG. 2 is a block diagram including various hardware and software components of the illustrative network bridging system depicted in FIG. 1, according to one or more example embodiments of the present disclosure.

FIG. 2, depicts the bridging device(s) 140, which may include one or more processors 230, one or more communications processors 235, one or more antennas 232, and/or one or more memories 240.

As depicted herein, the processors 230 may be configured to operate instructions, applications, and/or software associated with services provided by the bridging device(s) 140. These instructions, applications, and/or software may be stored on the memory 240, depicted as one or more operating systems (O/S) 245 and/or one or more applications 250, and may be retrievable and executable by the processors 230. Alternatively, the instructions, applications, and/or software executed by the processors 230 may be stored in any suitable location, such as the cloud or other remote locations. The instructions, applications, and/or software modules, such as O/S 245 and/or application 250 may or may not correspond to physical locations and/or addresses in the memory 240. In other words, the contents of each of the modules may not be segregated from each other and may, in fact, be stored in at least partially interleaved positions on the memory 240.

The processor(s) 230 may include, without limitation, a central processing unit (CPU), a digital signal processor (DSP), a reduced instruction set computer (RISC), a complex instruction set computer (CISC), or any combination thereof. The bridging device(s) 140 may also include a chipset (not shown) for controlling communications between the processor(s) 230 and one or more of the other components of the bridging device(s) 140. In one embodiment, the bridging device(s) 140 may be based on an Intel® Architecture system, and the processor(s) 230 and the chipset may be from a family of Intel® processors and chipsets, such as the Intel® Atom® processor family. The processor(s) 230 may also include one or more processors as part of one or more application-specific integrated circuits (ASICs) or application-specific standard products (ASSPs) for handling specific data processing functions or tasks.

The one or more antennas 232 may be any suitable antenna for wireless communications. The one or more antennas 232 may be uni-directional, bi-directional, or omni-directional. In certain embodiments, the antenna may be a patch antenna. In some cases, the antenna 232 may be integrated with one of the communications processors 235, the processors 230, or any other elements of the bridging device(s) 140.

The communications processor(s) 235 may be configured to communicate with the processors 230 or other elements of the bridging device(s) 140 to transmit and/or receive communications signals via any suitable communications mechanism, link, channel, or standard. The communications processor 235 may be configured to receive a communications signal and appropriately modulate, or otherwise transform the signal and provide the signal to the antenna 232 for transmission via wireless channels, such as Wi-Fi. The communications processors 235 may further be configured to receive communications signals from the antenna 232 and demodulate, or otherwise transform, the received signals, and provide the transformed signals to the processors 230 for further processing and/or storage. In certain aspects, the communications processors 235 may enable communications using a variety of modulation schemes, standards, and channels. In some cases, the communications processors 235 may be a separate element from the processors 230 and, in other cases, the communications processors 235 may be integrated with the processors 230.

The memory 240 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The O/S 245 may be configured to enable the operation of the one or more applications 250 on the processors 230. In one aspect, the O/S 245 may provide a common interface for the application 250 to interface with, utilize, and/or control the various hardware elements of a bridging device(s) 140. The details of operating systems are well-known and will not be discussed in significant detail herein. Example operating systems may include, but are not limited to, Google® Android®, Apple® iOS®, Microsoft® Windows Mobile®, Microsoft® Windows 7®, Linux, Unix or the like.

The O/S 245 may be configured to enable the operation of the one or more network bridging module(s) 255 on the processors 230 and/or communications processors 235 of the bridging device(s) 140.

The network bridging module(s) 255 may power up one or more of a mesh network interface (e.g., IEEE 802.15.4 mesh network), one or more wireless interfaces (e.g., IEEE 802.11 Wi-Fi network), and/or any components that serve as an interface between various components in the illustrative network bridging system 100.

The network bridging module(s) 255 may configure components within the network bridging system 100 suited for the available frequency segments. The network bridging module(s) 255 may be configured to initiate and activate a backhaul link that utilizes the available frequency segments to transmit and receive data. The network bridging module(s) 255 may also be configured to determine the permitted time duration for using the backhaul link.

The network bridging module(s) 255 may query a spectrum database in order to discover frequencies, transmit power levels, and/or lease durations that are permitted in a geographical area. For example, if sub-1 GHz frequencies are available for usage, the one or more bridging device(s) 140 may configure various parameters within components of the one or more bridging device(s) 140 to best suit the available frequency bandwidth. Additionally/alternatively, the network bridging module(s) 255 may identify frequencies available through LSA/ASA scheme, which may be available for usage. Some of the parameters may be channel bandwidth, transmit power amplifier, bandpass center frequency and/or modulation scheme. It is understood that the above are only examples and that other parameters may be utilized to configure the one or more bridging device(s) 140.

The network bridging module(s) 255 may initiate a backhaul link to establish a connection between one or more users and a network (e.g., Internet). It is understood that a backhaul link may be a link that may allow a communications system to get data from a user to a component in a network such as the Internet or the proprietary network of a large business, academic institution, or government agency. It is also understood that when the backhaul link is established, the backhaul link may be considered as active and data may be sent back and forth between one or more users (e.g., user 110), and one or more networks (e.g., networks 130 and 135).

The network bridging module(s) 255 may determine whether the duration for using the established backhaul link has been exceeded. For example, there may be a limitation and/or lease duration of a backhaul link during one or more communication sessions. The limitation may be determined by information found at the spectrum database with respect to the available bandwidth that may have been selected. In that case, the bridging device(s) 140 may request updated information from the spectrum database 170 and reinitiate and/or reactivate the backhaul link.

Figure 3:
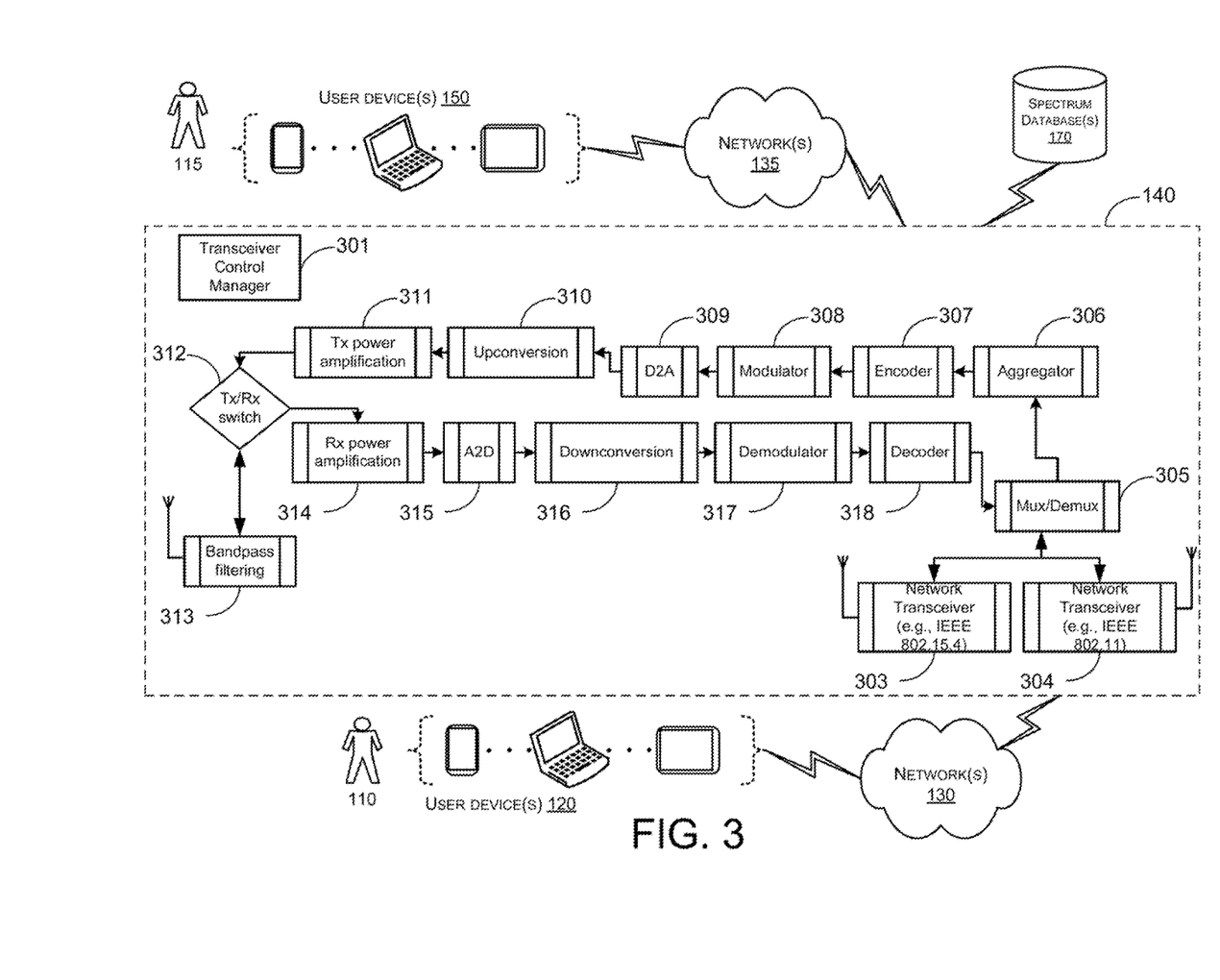
FIG. 3 depicts a block diagram including various hardware components of the illustrative network bridging system depicted in FIG. 1, according to one or more example embodiments of the present disclosure.

FIG. 3 is an example illustrative embodiment of a bridging device 140 in accordance with one or more embodiments of the disclosure.

For illustrative purposes, an example transmit path and a receive path through the bridging device 140 will be explained. For example, the transmit and receive paths may be between a user 110 and a user 115, where the user 110 may be located in an area that lacks typical Wi-Fi access. The transmit path may be from user 110 to user 115, and the received path may be from user 115 to user 110.

In one embodiment, the bridging device 140 may include, but not limited to, one or more hardware devices and/or software modules that may bridge one network (e.g., network 130) to another network (e.g., network 135). The bridging device 140 may include, for example, a transceiver control manager 301, an IEEE 802.15.4 transceiver 303, an IEEE 802.11 transceiver 304, a multiplexer/demultiplexer 305, an aggregator 306, an encoder 307, a modulator 308, a digital-to-analog converter 309, an upconversion system 310, a transmit power amplification system 311, a switch 312, a bandpass filter 313, a receive power amplification system 314, an analog-to-digital converter 315, a downconversion system 316, a demodulator 317, and a decoder 318. It is understood that the above are only examples of the one or more hardware devices and/or software modules that may be included within the bridging device 140.

In one embodiment, the transceiver control manager 301 may be configured to manage the overall operations of the bridging device 140. The transceiver control manager 301 may interface with the spectrum database 170 and/or LSA/ASA in order to obtain a list of available frequencies (e.g., sub-1 GHz frequencies) from a spectrum database and/or through LSA/ASA scheme, and to determine the permitted power levels and lease times available for each frequency.

The network transceivers 303 and 304 may be devices that can transmit and receive data communications. They may be configured to interface between a user device and the bridging device(s) 140. For example, the network transceiver 303 may be configured as a wireless interface commonly used for mesh networking (e.g., IEEE 802.15.4). Network transceiver 303 may also be a transceiver in accordance with Wi-Fi, Zigbee©, Zwave©, or cellular networks such as GPRS, 3G, and Long Term Evolution (LTE) based on the 3GPP range of standards. It is understood that although IEEE 802.15.4 transceiver is depicted as an example of a network transceiver 303 within bridging device 140, other wireless transceivers may be utilized. The network transceiver 304 may be a wireless interface (e.g., Wi-Fi (IEEE 802.11), Bluetooth©, etc.). Although the network transceiver 304 is depicted as an IEEE 802.11 transceiver, it is understood that it is an example of a wireless transceiver within bridging device(s) 140 and other wireless transceivers may be utilized.

On the transmit path, when the user 110 attempts to connect to user 115 from an area lacking typical Wi-Fi access or other wireless access, the bridging device 140 may act as an intermediary between user 110 and user 115. The bridging device 140 may utilize one or more frequency segments that may be unused (e.g., white spaces and/or frequencies available through LSA/ASA context). In this example, the user device 120 operated by user 110 may send one or more signals (in accordance to one or more wireless standards) that arrive at one or more network interfaces (e.g., network transceivers 303 and/or 304) of the bridging device 140. For example, if an IEEE 802.11 signal is sent, it may be received at an IEEE 802.11 transceiver of the bridging device 140. Since signals in accordance with various wireless standards may be sent from user device 120, these signals may be multiplexed together using the multiplexer/demultiplexer 305 into a multiplexed signal after being received at the one or more transceivers. The multiplexer/demultiplexer 305 may be used for the serialization and deserialization of data frames from one or more network transceivers (e.g., 303 and/or 304). The multiplexed signal may go through a series of transformations in the transmit path from Wi-Fi, Zigbee© or cellular networks. For example, the multiplexed signal may go through an aggregator 306, which may aggregate the data received from the multiplexer/demultiplexer 305. Next, the signal may go through an encoder 307, which may perform forward error correction encoding. The signal may proceed through a modulator 308, which may be used for modulating signals received at its input port. Next, the output from the modulator 308 may pass through a digital-to-analog converter 309 that may be configured to convert a digital baseband signal to an analog waveform. It is understood that a baseband signal is a signal transmitted without modulation, that is, without any shift in the range of frequencies of the signal. Further, the data may go through an upconversion system 310, which may be configured to convert a baseband signal to a passband signal. It is understood that a passband signal is the portion of the frequency spectrum that is transmitted by some filtering device. In other words, it is a band of frequencies, which passes through some filter, or set of filters. Then, the signal may go through a transmit power amplification 311 that may be comprised of one or more stages of amplification. The transmit power amplification 311 may be used to amplify a passband signal prior to transmission and to amplify an incoming received signal prior to demodulation and data recovery. A switch 312 may be used to allow switching between transmit and receive signal paths. Finally, the bandpass filter 313 may be configured to attenuate out-of-band signals to minimize the possibility of interference to adjacent wireless services and/or to minimize the effect of any strong adjacent signals on the data demodulation and recovery stages. The signal may then be sent using an available frequency segment, for example, on the sub-1 GHz spectrum or frequencies available through the LSA/ASA scheme.

On the receive path, and for illustrative purposes, the signals may flow from user 115 to user 110. In that case, user device 150 may initiate a communication session with user device 120. The signals sent from user device 150 may reach the bridging device 140 through network 135. The received signals may pass through a series of transformations in preparation for transmission over the network transceivers 303 and/or 304 to reach the user device 120. The receive signal may be received at the bandpass filtering device 313. It is understood that a bandpass filter is a device that passes frequencies within a certain range and rejects frequencies outside that range. The output then goes to the TX/RX switch 312, which sends the signals through the receive path of the bridging device 140. The received signal may go through the receive power amplification system 314, which may be used to amplify a received signal. Next, the amplified signal may be received by the analog-to-digital converter 315, which may be configured to convert the received signal from a bandpass filtered analog signal to a digital representation. This may be followed by a downconversion through the downconversion system 316, which may be configured to convert a passband signal to complex-valued baseband representation. The signal may then go through the demodulator 317 that may be configured to convert the complex-valued baseband signal to a digital bitstream. Then, the signal may go through the decoder 318, which may be configured to correct bit errors that may have been introduced in the signal reception process. The signal then is demultiplexed through the multiplexer/demultiplexer 305 before being sent through either the network transceiver 303 and/or 304 based on the signal characteristics. At that point, the signal may go through network 130 to reach user device 120, operated by user 110.

Figure 4:
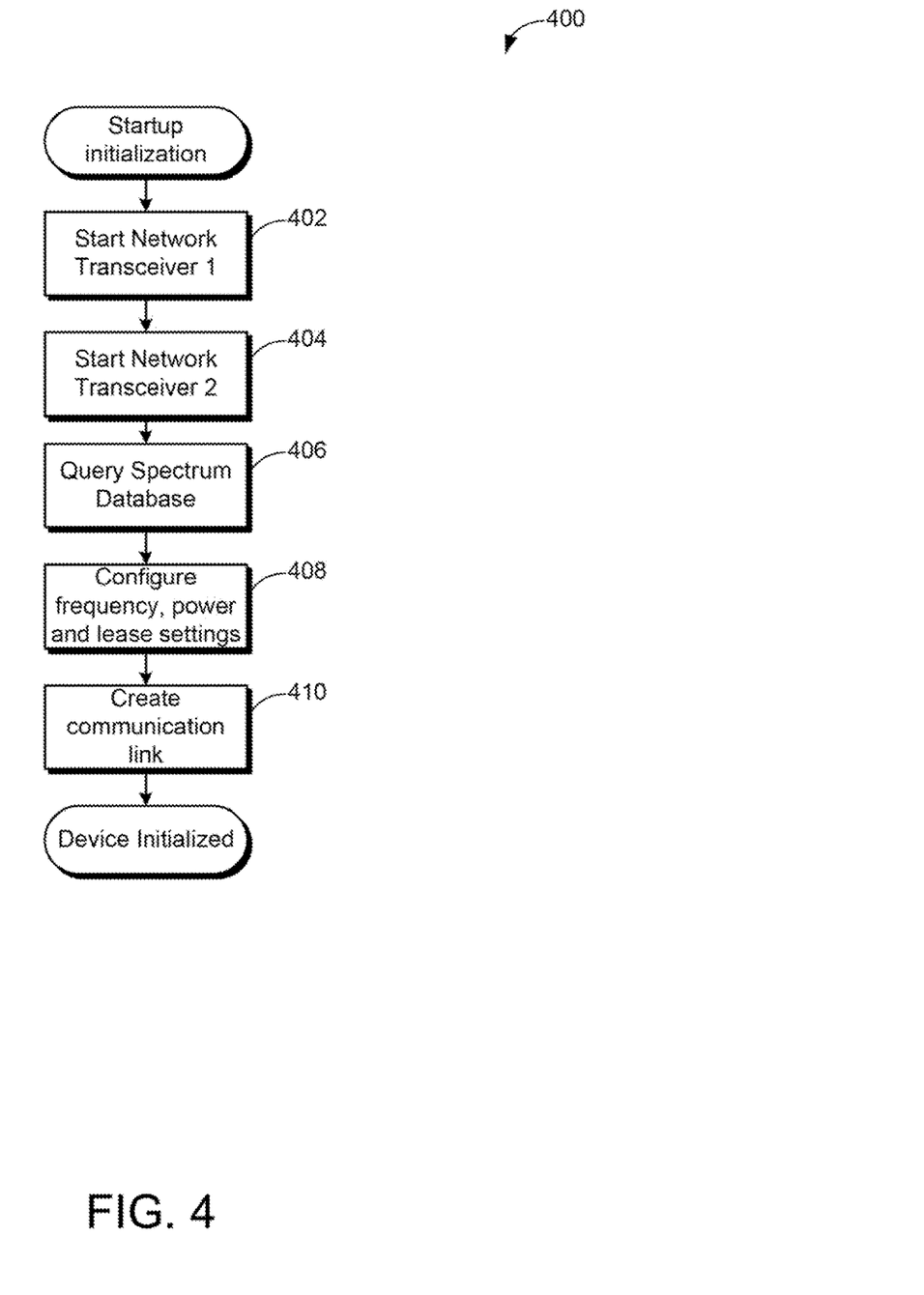
FIG. 4 is a flow diagram of an illustrative process for a network bridging system in accordance with one or more embodiments of the disclosure.

Referring to FIG. 4, there is shown an example illustrative embodiment of an initialization process 400 of the bridging device 140 in accordance to an embodiment of the disclosure.

In one embodiment, the initialization of bridging device 140 may involve powering up the network transceivers 303 and 304 (e.g., the IEEE 802.15.4 (mesh networking), and IEEE 802.11 (Wi-Fi) interfaces), at blocks 402 and 404. Powering up the network transceivers 303 and 304 may include providing electrical power to these transceivers. For example, electrical power may be provided through battery, solar, electrical cables, or any other means for supplying electricity to the network transceivers 303 and 304. The powering up of the network transceivers 303 and 304 may include starting one or more initialization processes in order to ensure proper connectivity to the other devices within the bridging device 140.

At block 406, the bridging device(s) 140 may query a spectrum database for whitespaces and/or for LSA/ASA available frequencies, in order to discover the frequencies, transmit power levels, and lease durations that are permitted in that geographical area. For example, a spectrum database may contain a list of frequency segments (e.g., white spaces and/or LSA/ASA) that may be unutilized and ready to be utilized by the bridging device 140. The spectrum database may provide one or more characteristics of the available frequency segments. Some examples of these characteristics may be transmit power levels and lease durations. For example, the bridging device 140 may be required to utilize a certain transmit power level in order to utilize the available white spaces. In addition, the spectrum database may provide the duration that these available white spaces may be used for.

At block 408, if frequency segments are available for usage, the bridging device(s) 140 may configure the channel bandwidth, transmit power amplifier, bandpass center frequency and modulation scheme to best suit the available frequency bandwidth. For example, a certain channel bandwidth may be required for utilizing the available frequency segments.

At block 410, the bridging device(s) 140 may establish a communication link that may use the available frequency segments. The communication link may be ready for transmission of signals between a user device and the Internet or another user device.

Figure 5:
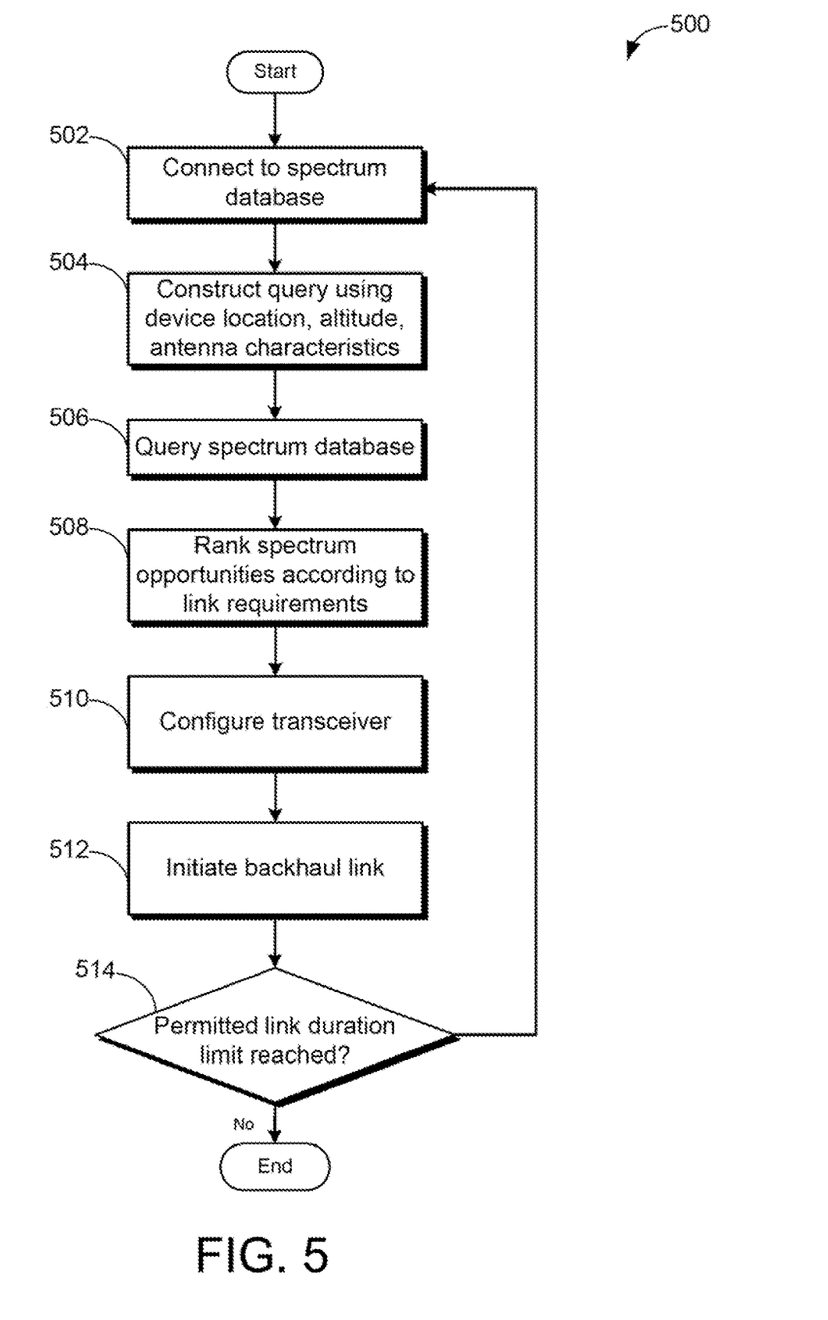
FIG. 5 is a flow diagram of an illustrative process for a network bridging system in accordance with one or more embodiments of the disclosure.

FIG. 5 shows an example illustrative embodiment of a network bridging system 500 in accordance to an embodiment of the disclosure. FIG. 5 depicts an example of accessing a spectrum database to retrieve one or more available frequency segments in order to establish a backhaul link that will facilitate connection between, for example, user devices 120 and user devices 150 or the Internet.

As explained above, the bridging device(s) 140 may include a transceiver control manager 301 that may be responsible for the control and configuration of the bridging device(s) 140 to utilize the unused frequency segments such as white spaces and/or through LSA/ASA. Some of the transceiver control manager 301 operations may include, at least in part, constructing queries to identify available frequency segments, rank the available frequency segments based on a linked requirement, configuring one or more transceivers, and initiating the backhaul link. It is understood that the above are only examples of operations of the transceiver control manager 301 and that other operations may be implemented.

At block 502, the transceiver control manager 301 may establish a connection to a spectrum database in order to identify one or more available frequency segments to be utilized when connecting two or more devices (e.g., user devices 120 and 150).

At block 504, the transceiver control manager 301 may construct a query using information about the bridging device(s) 140. For example, the bridging device(s) 140 information may include at least in part the bridging device(s) 140 location, altitude, antenna details, power amplifier and filtering specifications.

At block 506, the transceiver control manager 301 may query the spectrum database for available frequency segments. Information from the spectrum database and the backhaul link requirements may be then used to establish the optimum characteristics for the bridging device(s) 140. Examples of these characteristics include the frequency of operation, the available spectrum bandwidth, the permitted transmission power level, and the permitted duration of usage.

At block 508, the transceiver control manager 301 may rank the available frequency segments according to the requirements of the backhaul link to be established for connecting, for example, user devices 120 and 150. At block 510, the transceiver control manager 301 may then select optimum characteristics to configure the bridging device(s) 140 at block 512, the backhaul link may be initiated using the one or more configurations established in the steps above. When the link is established, the backhaul link may then be considered active.

At block 514, if the required backhaul link duration exceeds the permitted link duration as directed by the spectrum database, the transceiver control manager 301 may request updated information from the spectrum database and may repeat the workflow tasks required to re-establish the link. For example, the spectrum database may have listed the durations that the available frequency segments may be utilized for and in case the duration is less than the required backhaul link duration, the transceiver control manager 301 may reestablish the link using other available frequency segments in order to meet the required backhaul link duration.

Figure 6:
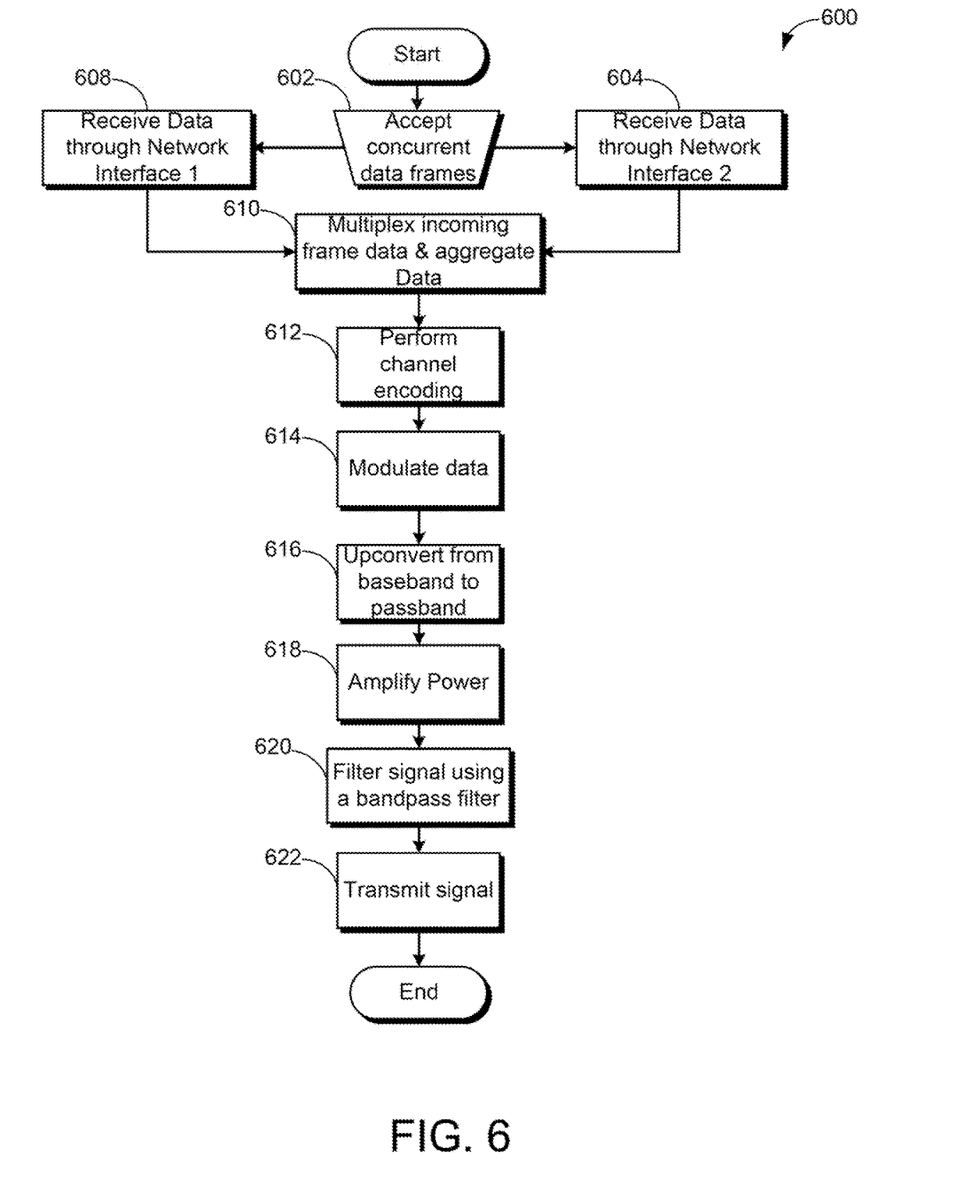
FIG. 6 is a flow diagram of an illustrative process for a network bridging system in accordance with one or more embodiments of the disclosure

Referring to FIG. 6, an example illustrative embodiment of a network bridging system 600 for a transmit data path at the bridging device(s) 140 in accordance to an embodiment of the disclosure. For example, a user 110 located in an area that lacks typical Wi-Fi access may operate user devices 120 in order to establish a connection to the Internet or to another user 115.

At block 602, the bridging device(s) 140 may receive data frames from user devices 120 operated by user 110 through network 130. For example, the data frames may be from Wi-Fi-enabled wireless sensors (e.g., wireless sensor/actuator device(s) 160) and/or from an IEEE 802.15.4 mesh network. For example, at block 604, data may be received through an IEEE 802.11 interface in accordance with the IEEE 802.11 standard. And at block 608, data may also be received through another interface (e.g., IEEE 802.15.4) in accordance with the different wireless standard.

At block 610, data frames received on the wireless interfaces (e.g., network interfaces 303 and 304) of the bridging device(s) 140 may converge at a multiplexer. The multiplexer (e.g., multiplexer/demultiplexer 305) may aggregate data frames from both interfaces into a single data frame stream. The multiplexed data frames may then be prepared for transmission using sub 1 GHz frequencies that may be available through a spectrum database, including white spaces and/or frequencies available through LSA/ASA scheme.

At block 612, the multiplexing/aggregation process, the bridging device(s) 140 may encode the datastream in preparation for transmission. The encoding process may be required to increase resilience against errors introduced over the wireless transmission link and to enable the bridging device(s) 140 to correct errors that may otherwise result in an inability to recover the information correctly.

At block 614, the bridging device(s) 140 may perform modulation. Data modulation may be the process of converting a digital bit stream into a complex-valued baseband signal. This complex-valued baseband signal may represent the original bit stream by varying the amplitude and phase of one or more sinusoidal waveforms in preparation for transmission using the available sub-1 GHz frequency segments or frequencies available through LSA/ASA scheme.

At block 616, and following modulation, the bridging device(s) 140 may convert the complex-valued baseband signal to a passband signal. This process may entail one or more stages of frequency conversion where the baseband (and intermediate stage) signals may be multiplied by a local frequency oscillator. The exact passband frequency range may be modified by configuring a local oscillator.

At blocks 618 and 620, prior to transmission of the data frames from user device 120, the bridging device(s) 140 may amplify and filter the signal to attenuate any unwanted signal components and to help prevent interference to any adjacent wireless services.

At block 622, the bridging device 140 may transmit the signal to the user device 150 and/or the Internet.

Figure 7:
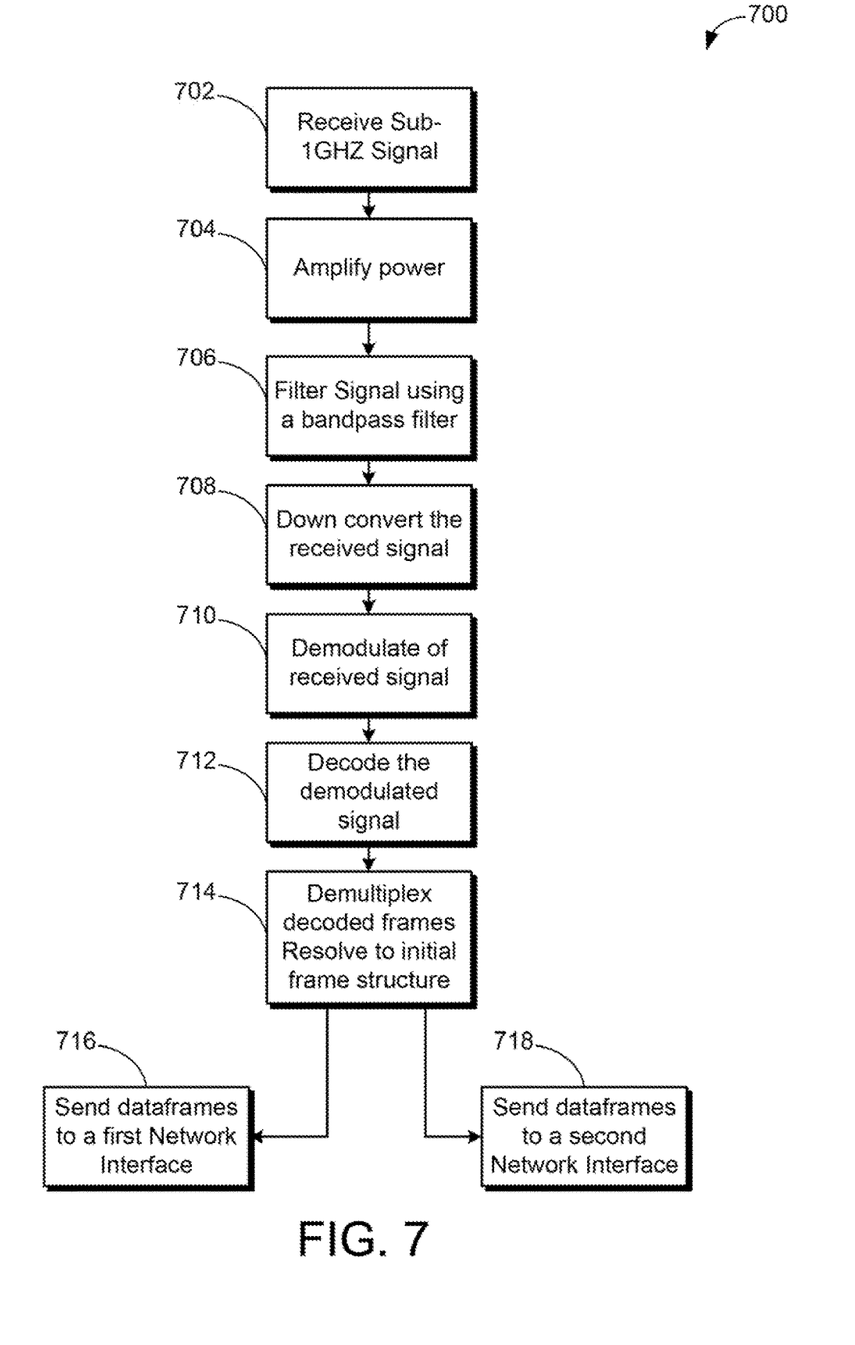
FIG. 7 is a flow diagram of an illustrative process for a network bridging system in accordance with one or more embodiments of the disclosure.

Referring to FIG. 7, an example illustrative embodiment of a network bridging system 700 for receive data path at the bridging device(s) 140 in accordance to an embodiment of the disclosure. For example, a user 115 may operate a user device 150 to establish a connection with a user 110 located in an area lacking typical Wi-Fi access.

In an embodiment, the bridging device 140 may receive one or more sub-1 GHz signals from user device 150 through network 135. In this receive path, the bridging device(s) 140 may perform signal preparations in order to transmit the signal through one or more network transceivers in accordance with one or more wireless standards in order to reach user device 120.

At block 702, the bridging device 140 may receive one or more sub-1 GHz signals.

At block 704, the bridging device 140 may perform power amplification on the received signals. This may be achieved by taking energy from a power supply and controlling the output to match the input signal shape but with a larger amplitude.

At block 706, the bridging device 140 may perform signal filtering using a bandpass filter to attenuate any unwanted signal components and to help prevent interference to any adjacent wireless services.

At block 708, the amplified passband signal may then be converted into complex-valued baseband representation.

At block 710, and following downconversion, the complex-valued baseband signal may then be converted back to a digital bit stream. However, the received signal may have been affected by noise, signal fading, interference from other services, and attenuation due to the propagation of the signal over the wireless link.

At block 712, in order to help correct errors that may have been introduced during these processes, the channel decoder may use redundant data introduced in the transmitter channel encoding process to help correct bit errors.

At block 714, the output of this stage is then converted to a data frame stream, which then may be demultiplexed by the multiplexer/demultiplexer 305.

At block 716, the demultiplexed data frames stream may be directed to the network transceivers (e.g., network transceivers 303 and/or 304).

According to example embodiments of the disclosure, there may be a device. The device may include a transceiver configured to transmit and receive wireless signals, an antenna coupled to the transceiver, one or more processors in communication with the transceiver, at least one memory that stores computer-executable instructions, and at least one processor of the one or more processors configured to access the at least one memory. The at least one processor of the one or more processors may be configured to receive one or more signals on a wireless interface in accordance with a first communication standard. The at least one processor of the one or more processors may be configured to execute the computer-executable instructions to transform the one or more signals into one or more converted signals for transmission on one or more network interfaces in accordance with one or more second communication standards. The at least one processor of the one or more processors may be configured to execute the computer-executable instructions to send the one or more converted signals on the one or more network interfaces.

The one or more signals may be associated with one or more sub-1 GHz frequency segments. The computer-executable instructions to transform the one or more signals may further include computer-executable instructions to generate one or more amplified signals based at least in part on the one or more signals. The computer-executable instructions to transform the one or more signals may further include computer-executable instructions to generate one or more filtered signals based at least in part on the one or more amplified signals. The computer-executable instructions to transform the one or more signals may further include computer-executable instructions to generate one or more down converted signals based at least in part on the one or more amplified signals. The computer-executable instructions to transform the one or more signals may further include computer-executable instructions to generate one or more demodulated signals based at least in part on the one or more down converted signals. The computer-executable instructions to transform the one or more signals may further include computer-executable instructions to generate one or more demultiplexed signals based at least in part on the one or more demodulated signals. The computer-executable instructions to transform the one or more signals may further include computer-executable instructions to send the one or more demultiplexed signals to one or more wireless interfaces in accordance to one or more wireless standards. The one or more network interface may include at least one of a mesh networking interface, a Wi-Fi interface, a Bluetooth interface, and an ultra-high frequency (UHF) interface. The one or more demultiplexed signals may include deserialized data frames associated with the one or more demodulated signals. The computer-executable instructions to generate one or more down converted signals may include converting the one or more filtered signals to a lower frequency than a frequency of the one or more filtered signals.

In example embodiments of the disclosure, there may be a computer-readable medium storing computer-executable instructions which, when executed by a processor, cause the processor to perform operations. The operations may include identifying one or more signals at one or more communication interfaces in accordance with one or more communication standards. The operations may include selecting one or more available frequency segments from a frequency spectrum database. The operations may include transforming the one or more signals into one or more converted signals for transmission on a backhaul link, the backhaul link being established for two-way data communication using the one or more available frequency segments. The operations may include causing to send the one or more converted signals using the one or more available frequency segments.

The frequency spectrum database includes at least one of one or more sub-one Giga Hertz (sub-1 GHz) frequency segments, and one or more frequency segments available through a Licensed Shared Access (LSA)/Authorized Shared Access (ASA) scheme. The operations to transform the one or more signals may further include performing forward error correction encoding on the received one or more signals, modulating the one or more signals in accordance with a modulation scheme to convert one or more signals into one or more baseband signals, upconverting the one or more baseband signals to one or more passband signals, performing power amplification on the one or more passband signals, and filtering the one or more passband signals using a bandpass filter. The operations to transform the one or more signals may further include multiplexing a first signal of the one or more signals and a second signal of the one or more signals, wherein the first signal may be received on a first communication interface in accordance with a first communication standard and the second signal may be received on a second communication interface in accordance with a second communication standard. Multiplexing the first signal and the second signal may include serialization of data frames associated with the first signal and the second signal. The first communication interface and the second communication interface may include at least one of a mesh networking interface, a Wi-Fi interface, a Bluetooth interface, and an ultra-high frequency (UHF) interface. The operations may further include determining a permitted time duration for transmission on the backhaul link of the one or more converted signals. The operations may further include configuring at least one of a channel bandwidth, a transmit power amplifier, a bandpass center frequency and a modulation scheme associated with one or more components of the computing device to be suited for the one or more available frequency segments. The operations may further comprise determining the time duration for transmission on the backhaul link of the one or more converted signal has expired, and reactivating the backhaul link. Reactivating the backhaul link may include reestablishing the link using other available frequency segments to meet a required backhaul link duration.

In example embodiments of the disclosure, there may be a method for wireless communication. The method may include identifying, by a computing device comprising one or more processors and one or more transceiver components, one or more signals at one or more communication interfaces in accordance with one or more communication standards. The method may include selecting, by the computing device, one or more available frequency segments from a frequency spectrum database. The method may include transforming, by the computing device, the one or more signals into one or more converted signals for transmission on a backhaul link, the backhaul link being established for two-way data communication using the one or more available frequency segments. The method may include causing to send, by the computing device, the one or more converted signals using the one or more available frequency segments.

The frequency spectrum database may include at least one of one or more sub-one Giga Hertz (sub-1 GHz) frequency segments, and one or more frequency segments available through a Licensed Shared Access (LSA)/Authorized Shared Access (ASA) scheme. Transforming the one or more signals may further include performing, by the computing device, forward error correction encoding on the received one or more signals, modulating, by the computing device, the one or more signals in accordance with a modulation scheme to convert one or more signals into one or more baseband signals, upconverting, by the computing device, the one or more baseband signals to one or more passband signals, performing, by the computing device, power amplification on the one or more passband signals, and filtering, by the computing device, the one or more passband signals using a bandpass filter. Transforming the one or more signals may further include multiplexing a first signal of the one or more signals and a second signal of the one or more signals, wherein the first signal is received on a first communication interface of the one or more communication interfaces in accordance with a first communication standard and the second signal is received on a second communication interface of the one or more communication interfaces in accordance with a second communication standard. Multiplexing the first signal and the second signal may include serialization of data frames associated with the first signal and the second signal. The first communication interface and the second communication interface may include at least one of a mesh networking interface, a Wi-Fi interface, a Bluetooth interface, or an ultra-high frequency (UHF) interface. Selecting one or more available frequency segments may include querying the frequency spectrum database using one or more characteristics of the computing device, including at least one of a location of the computing device, an altitude of the computing device, antenna details of the computing device, power amplifier specifications of the computing device, or filtering specifications of the computing device. The method may further include determining a permitted time duration for transmission on the backhaul link of the one or more converted signals. The method may further include configuring at least one of a channel bandwidth, a transmit power amplifier, a bandpass center frequency and a modulation scheme associated with one or more components of the computing device to be suited for the one or more available frequency segments. The method may further comprise determining the permitted time duration for transmission on the backhaul link of the one or more converted signals has expired, and reactivating the backhaul link. Reactivating the backhaul link may include reestablishing the link using other available frequency segments to meet a predetermined backhaul link duration.

In example embodiments of the disclosure, there may be a wireless communication system. The system may include at least one memory that store computer-executable instructions, and at least one processor configured to access the at least one memory, wherein the at least one processor may be configured to execute the computer-executable instructions to select one or more available frequency segments from a frequency spectrum database. The at least one processor may be configured to execute the computer-executable instructions to transform the one or more signals into one or more converted signals for transmission on a backhaul link, the backhaul link being established for two-way data communication using the one or more available frequency segments. The at least one processor may be configured to execute the computer-executable instructions to cause to send the one or more converted signals using the one or more available frequency segments.

The frequency spectrum database includes at least one of one or more sub-one Giga Hertz (sub-1 GHz) frequency segments, and one or more frequency segments available through a Licensed Shared Access (LSA)/Authorized Shared Access (ASA) scheme. Transforming the one or more signals may further include performing forward error correction encoding on the received one or more signals, modulating the one or more signals in accordance with a modulation scheme to convert one or more signals into one or more baseband signals, upconverting the one or more baseband signals to one or more passband signals, performing power amplification on the one or more passband signals, filtering the one or more passband signals using a bandpass filter. Transforming the one or more signals may further include multiplexing a first signal of the one or more signals and a second signal of the one or more signals, wherein the first signal is received on a first communication interface in accordance with a first communication standard and the second signal is received on a second communication interface in accordance with a second communication standard. Multiplexing the first signal and the second signal may include serialization of data frames associated with the first signal and the second signal. The first communication interface and the second communication interface may include at least one of a mesh networking interface, a Wi-Fi interface, a Bluetooth interface, and an ultra-high frequency (UHF) interface. The at least one processor may be further configured to execute the computer-executable instructions to determine a permitted time duration for transmission on the backhaul link of the one or more converted signals. The at least one processor may be further configured to execute the computer-executable instructions to configure at least one of a channel bandwidth, a transmit power amplifier, a bandpass center frequency and a modulation scheme associated with one or more components of the computing device to be suited for the one or more available frequency segments. The at least one processor may be configured to execute the computer-executable instructions to determine the time duration for transmission on the backhaul link of the one or more converted signal has expired, and reactivate the backhaul link. Reactivating the backhaul link may include reestablishing the link using other available frequency segments to meet a required backhaul link duration.

In example embodiments of the disclosure, there may be a wireless communication apparatus. The apparatus may include a means for selecting one or more available frequency segments from a frequency spectrum database. The apparatus may include a means for transforming the one or more signals into one or more converted signals for transmission on a backhaul link, the backhaul link being established for two-way data communication using the one or more available frequency segments. The apparatus may include a means for causing to send the one or more converted signals using the one or more available frequency segments.

The frequency spectrum database may include at least one of one or more sub-one Giga Hertz (sub-1 GHz) frequency segments, and one or more frequency segments available through a Licensed Shared Access (LSA)/Authorized Shared Access (ASA) scheme. Transforming the one or more signals may further include performing forward error correction encoding on the received one or more signals, modulating the one or more signals in accordance with a modulation scheme to convert one or more signals into one or more baseband signals, upconverting the one or more baseband signals to one or more passband signals, performing power amplification on the one or more passband signals, and filtering the one or more passband signals using a bandpass filter. Transforming the one or more signals may further include multiplexing a first signal of the one or more signals and a second signal of the one or more signals, wherein the first signal is received on a first communication interface in accordance with a first communication standard and the second signal is received on a second communication interface in accordance with a second communication standard. Multiplexing the first signal and the second signal may include serialization of data frames associated with the first signal and the second signal. The first communication interface and the second communication interface may include at least one of a mesh networking interface, a Wi-Fi interface, a Bluetooth interface, and an ultra-high frequency (UHF) interface. The apparatus may further include a means for determining a permitted time duration for transmission on the backhaul link of the one or more converted signals. The apparatus may further include a means for configuring at least one of a channel bandwidth, a transmit power amplifier, a bandpass center frequency and a modulation scheme associated with one or more components of the computing device to be suited for the one or more available frequency segments. The apparatus may further include a means for determining the time duration for transmission on the backhaul link of the one or more converted signal has expired, and means for reactivating the backhaul link. Reactivating the backhaul link may include reestablishing the link using other available frequency segments to meet a required backhaul link duration.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
one or more transceivers configured to transmit and receive wireless signals;
one or more antennas coupled to the one or more transceivers;
one or more processors in communication with the one or more transceivers;
at least one memory that stores computer-executable instructions; and
at least one processor of the one or more processors configured to access the at least one memory, wherein the at least one processor of the one or more processors is configured to execute the computer-executable instructions to:
receive one or more signals on one or more wireless interfaces in accordance with one or more communication standards;
select one or more available frequency segments from a frequency spectrum database;
transform the one or more signals into one or more converted signals for transmission on a backhaul link, the backhaul link being established for two-way data communication using the one or more available frequency segments from the frequency spectrum database;
determine a permitted time duration for transmission on the backhaul link of the one or more converted signals; and
send the one or more converted signals on the one or more network interfaces, wherein the one or more converted signals are sent using the one or more available frequency segments from the frequency spectrum database.

2. The device of claim 1, wherein the one or more signals are associated with one or more sub-1 GHz frequency segments.

3. The device of claim 1, wherein the computer-executable instructions to transform the one or more signals further include computer-executable instructions to:
generate one or more amplified signals based at least in part on the one or more signals;
generate one or more filtered signals based at least in part on the one or more amplified signals;
generate one or more down converted signals based at least in part on the one or more amplified signals;
generate one or more demodulated signals based at least in part on the one or more down converted signals; and
generate one or more demultiplexed signals based at least in part on the one or more demodulated signals.

4. The device of claim 3, wherein the one or more demultiplexed signals include deserialized data frames associated with the one or more demodulated signals.

5. The device of claim 3, wherein the computer-executable instructions to generate one or more down converted signals includes converting the one or more filtered signals to a lower frequency than a frequency of the one or more filtered signals.

6. The device of claim 1, wherein the one or more network interfaces include at least one of a mesh networking interface, a Wi-Fi interface, a Bluetooth interface, and an ultra-high frequency (UHF) interface.

7. A non-transitory computer-readable medium storing computer-executable instructions which, when executed by a processor, cause the processor to perform operations comprising:
identifying one or more signals at one or more communication interfaces in accordance with one or more communication standards;
selecting one or more available frequency segments from a frequency spectrum database;
transforming the one or more signals into one or more converted signals for transmission on a backhaul link, the backhaul link being established for two-way data communication using the one or more available frequency segments from the frequency spectrum database;
determining a permitted time duration for transmission on the backhaul link of the one or more converted signals; and
causing to send the one or more converted signals using the one or more available frequency segments.

8. The non-transitory computer-readable medium of claim 7, wherein the frequency spectrum database includes at least one of one or more sub-one Giga Hertz (sub-1 GHz) frequency segments, and one or more frequency segments available through a Licensed Shared Access (LSA)/Authorized Shared Access (ASA) scheme.

9. The non-transitory computer-readable medium of claim 7, wherein transforming the one or more signals further includes:
performing forward error correction encoding on the received one or more signals;
modulating the one or more signals in accordance with a modulation scheme to convert one or more signals into one or more baseband signals;
upconverting the one or more baseband signals to one or more passband signals;
performing power amplification on the one or more passband signals; and
filtering the one or more passband signals using a bandpass filter.

10. The non-transitory computer-readable medium of claim 7, wherein transforming the one or more signals further includes multiplexing a first signal of the one or more signals and a second signal of the one or more signals, wherein the first signal is received on a first communication interface in accordance with a first communication standard and the second signal is received on a second communication interface in accordance with a second communication standard.

11. The non-transitory computer-readable medium of claim 10, wherein multiplexing the first signal and the second signal includes serialization of data frames associated with the first signal and the second signal.

12. The non-transitory computer-readable medium of claim 10, wherein the first communication interface and the second communication interface include at least one of a mesh networking interface, a Wi-Fi interface, a Bluetooth interface, and an ultra-high frequency (UHF) interface.

13. The non-transitory computer-readable medium of claim 7, further includes configuring at least one of a channel bandwidth, a transmit power amplifier, a bandpass center frequency and a modulation scheme associated with one or more components of a computing device to be suited for the one or more available frequency segments.

14. The non-transitory computer-readable medium of claim 7, further comprising:
determining a time duration for transmission on the backhaul link of the one or more converted signals has expired; and
reactivating the backhaul link.

15. The non-transitory computer-readable medium of claim 7, wherein reactivating the backhaul link includes reestablishing the link using other available frequency segments to meet a required backhaul link duration.

16. A method comprising:
identifying, by a computing device comprising one or more processors and one or more transceiver components, one or more signals at one or more communication interfaces in accordance with one or more communication standards;
selecting, by the computing device, one or more available frequency segments from a frequency spectrum database;
transforming, by the computing device, the one or more signals into one or more converted signals for transmission on a backhaul link, the backhaul link being established for two-way data communication using the one or more available frequency segments from the frequency spectrum database;
determining a permitted time duration for transmission on the backhaul link of the one or more converted signals; and
causing to send, by the computing device, the one or more converted signals using the one or more available frequency segments.

17. The method of claim 16, wherein the frequency spectrum database includes at least one of one or more sub-one Giga Hertz (sub-1 GHz) frequency segments, and one or more frequency segments available through a Licensed Shared Access (LSA)/Authorized Shared Access (ASA) scheme.

18. The method of claim 16, wherein transforming the one or more signals further includes:
performing, by the computing device, forward error correction encoding on the received one or more signals;
modulating, by the computing device, the one or more signals in accordance with a modulation scheme to convert one or more signals into one or more baseband signals;
upconverting, by the computing device, the one or more baseband signals to one or more passband signals;
performing, by the computing device, power amplification on the one or more passband signals; and
filtering, by the computing device, the one or more passband signals using a bandpass filter.

19. The method of claim 16, wherein transforming the one or more signals further includes multiplexing a first signal of the one or more signals and a second signal of the one or more signals, wherein the first signal is received on a first communication interface of the one or more communication interfaces in accordance with a first communication standard and the second signal is received on a second communication interface of the one or more communication interfaces in accordance with a second communication standard.

20. The method of claim 19, wherein multiplexing the first signal and the second signal includes serialization of data frames associated with the first signal and the second signal.

21. The method of claim 19, wherein the first communication interface and the second communication interface include at least one of a mesh networking interface, a Wi-Fi interface, a Bluetooth interface, or an ultra-high frequency (UHF) interface.

22. The method of claim 16, wherein selecting one or more available frequency segments includes querying the frequency spectrum database using one or more characteristics of the computing device, including at least one of a location of the computing device, an altitude of the computing device, antenna details of the computing device, power amplifier specifications of the computing device, or filtering specifications of the computing device.

23. The method of claim 16, further includes configuring at least one of a channel bandwidth, a transmit power amplifier, a bandpass center frequency and a modulation scheme associated with one or more components of the computing device to be suited for the one or more available frequency segments.

24. The method of claim 16, further comprising:
determining the permitted time duration for transmission on the backhaul link of the one or more converted signals has expired; and
reactivating the backhaul link.

25. The method of claim 24, wherein reactivating the backhaul link includes reestablishing the link using other available frequency segments to meet a predetermined backhaul link duration.

* * * * *